(12) United States Patent
Kim et al.

(10) Patent No.: US 10,439,486 B2
(45) Date of Patent: Oct. 8, 2019

(54) RIPPLE COMPENSATOR, DATA DRIVING CIRCUIT INCLUDING THE RIPPLE COMPENSATOR, AND SEMICONDUCTOR DEVICE INCLUDING THE RIPPLE COMPENSATOR

(71) Applicant: SAMSUNG ELECTRONICS CO., LTD., Suwon-si, Gyeonggi-do (KR)

(72) Inventors: Sung-Jun Kim, Suwon-si (KR); Jong-Shin Shin, Yongiin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/891,392

(22) Filed: Feb. 8, 2018

(65) Prior Publication Data

US 2019/0036443 A1    Jan. 31, 2019

(30) Foreign Application Priority Data

Jul. 25, 2017    (KR) .......................... 10-2017-0094323

(51) Int. Cl.
  *H02M 1/14*    (2006.01)
  *G06F 1/26*    (2006.01)
(52) U.S. Cl.
  CPC .............. *H02M 1/143* (2013.01); *G06F 1/26* (2013.01)
(58) Field of Classification Search
  CPC ................................ H02M 1/143; G06F 1/26
  See application file for complete search history.

(56) References Cited

U.S. PATENT DOCUMENTS

| 6,088,756 | A | * | 7/2000 | Munoz-Bustamante ..................... H03K 19/09429 326/56 |
| 6,388,503 | B1 | | 5/2002 | Maloney |
| 6,424,570 | B1 | | 7/2002 | Le et al. |
| 6,483,358 | B2 | | 11/2002 | Ingino, Jr. |
| 6,744,242 | B1 | | 6/2004 | Giacomotto et al. |
| 7,471,155 | B1 | * | 12/2008 | Levesque .................. H03F 1/30 330/296 |
| 8,575,982 | B1 | | 11/2013 | Kim et al. |
| 8,836,384 | B1 | | 9/2014 | Oh et al. |

(Continued)

FOREIGN PATENT DOCUMENTS

CN    106208692 A    12/2016
GB    2473625 A    3/2011

OTHER PUBLICATIONS

Office Action From Intellectual Property Office of Singapore dated Nov. 16, 2018 Cited in Patent Application No. 10201803995Q.

(Continued)

*Primary Examiner* — Emily P Pham
(74) *Attorney, Agent, or Firm* — Volentine, Whitt & Francos, PLLC

(57) ABSTRACT

A semiconductor device includes a data driving circuit configured to receive input data, receive a first power supply voltage through a first node, and to generate output data by driving the input data, and a ripple compensator connected to the first node and configured to receive the input data in parallel with the data driving circuit, to generate a compensation current corresponding to a pattern of the input data, and to provide the compensation current to the first node to reduce a ripple of the first power supply voltage.

20 Claims, 14 Drawing Sheets

(56) References Cited

U.S. PATENT DOCUMENTS

| | | | |
|---|---|---|---|
| 8,878,118 B2 | 11/2014 | Johansson et al. | |
| 9,076,551 B2 | 7/2015 | Dally et al. | |
| 9,589,627 B1* | 3/2017 | Wilson | H03K 19/00315 |
| 9,748,934 B1* | 8/2017 | Oh | H03K 19/00346 |
| 2002/0060558 A1* | 5/2002 | Oki | G05F 3/227 |
| | | | 323/282 |
| 2004/0268088 A1* | 12/2004 | Lippincott | G06F 9/4494 |
| | | | 712/25 |
| 2008/0205095 A1* | 8/2008 | Pinon | H02M 3/1584 |
| | | | 363/39 |
| 2012/0274394 A1 | 11/2012 | Chan | |
| 2014/0268976 A1 | 9/2014 | Dally et al. | |
| 2015/0066230 A1 | 3/2015 | Ulrich | |
| 2015/0069995 A1 | 3/2015 | Schrom et al. | |
| 2016/0218896 A1 | 7/2016 | Fiedler | |
| 2018/0062511 A1 | 3/2018 | Wong et al. | |

OTHER PUBLICATIONS

Office Action From Intellectual Property Office of Singapore dated Nov. 18, 2018 Cited in Patent Application No. 10201803995Q.

* cited by examiner

RIPPLE COMPENSATOR, DATA DRIVING CIRCUIT INCLUDING THE RIPPLE COMPENSATOR, AND SEMICONDUCTOR DEVICE INCLUDING THE RIPPLE COMPENSATOR

CROSS-REFERENCE TO RELATED APPLICATION

This application claims the benefit of Korean Patent Application No. 10-2017-0094323, filed on Jul. 25, 2017, in the Korean Intellectual Property Office, the disclosure of which is incorporated herein in its entirety by reference.

BACKGROUND

The inventive concept relates to a ripple compensator, and more particularly, to a ripple compensator for reducing ripples of a power supply voltage, a data driving circuit including the ripple compensator, and a semiconductor device including the ripple compensator.

Generally, a semiconductor device may include a circuit block for processing a signal and operating in a range between a power supply voltage and a ground voltage. As an example, the semiconductor device may include a plurality of circuit blocks as signal processing units. For example, a data driving circuit provided in the semiconductor device may generate output data in a range between the power supply voltage and the ground voltage in response to input data.

The circuit block is driven by a power supply voltage having a predetermined level, and a switching current may be generated during the signal processing of the circuit block. In this case, the switching current may cause a ripple in the power supply voltage due to an impedance effect of a power distributed network (PDN) such as a package model of a semiconductor device. When a ripple occurs in the power supply voltage, signal processing characteristics may be degraded.

SUMMARY

The inventive concept provides a ripple compensator capable of improving signal processing characteristics by reducing a ripple of a power supply voltage, a data driving circuit including the ripple compensator, and a semiconductor device including the ripple compensator.

According to an aspect of the inventive concept, there is provided a semiconductor device including: a data driving circuit configured to receive input data, receive a first power supply voltage through a first node, and generate output data by driving the input data; and a ripple compensator connected to the first node and configured to receive the input data in parallel with the data driving circuit, generate a compensation current corresponding to a pattern of the input data, and provide the compensation current to the first node to reduce a ripple of the first power supply voltage.

According to another aspect of the inventive concept, there is provided a data driving circuit including: one or more data drivers configured to receive input data, receive a first power supply voltage through a first node, and generate output data through an operation of processing a signal of which a level changes between the first power supply voltage and a ground voltage; and a ripple compensator coupled to the first node through a path for carrying a compensation current, wherein the ripple compensator includes at least one buffer for receiving the input data and a compensation capacitance device (e.g., a capacitor) connected to an output terminal of the buffer, the compensation capacitance device being configured to vary a voltage level of a second node in response to a transition of the input data and transfer the compensation current to the first node based on a level difference between a voltage of the first node and a voltage of the second node.

According to another aspect of the inventive concept, there is provided a ripple compensator connected to a first node of a circuit block generating a consumption current according to a pattern of input data, the ripple compensator including: a first diode connected between a node to which a first power supply voltage is applied and a compensation node; a buffer configured to receive the input data in parallel with the circuit block and driven by a second power supply voltage; and a compensation capacitance device connected between an output terminal of the buffer and the compensation node, wherein the ripple compensator is configured to supply to the circuit block a compensation current generated based on a voltage level difference between the compensation node and the first node of the circuit block.

According to yet another aspect of the inventive concept, a device, comprises: a data processing circuit having a first node which is configured to receive a first power supply voltage, and further having at least one data input configured to receive input data, wherein the data processing circuit produces a ripple voltage on the first power supply voltage in response to changes in the input data; and a ripple compensator having a data input configured to receive the input data in parallel with the data processing circuit, and having an output connected to the first node, wherein the ripple compensator is configured to process the input data to produce a compensation signal and to provide the compensation signal to the first node to reduce the ripple voltage on the first power supply voltage.

BRIEF DESCRIPTION OF THE DRAWINGS

Embodiments of the inventive concept will be more clearly understood from the following detailed description taken in conjunction with the accompanying drawings.

DETAILED DESCRIPTION OF THE EMBODIMENTS

Hereinafter, embodiments of the inventive concept will be described in detail with reference to the accompanying drawings.

Figure 1:
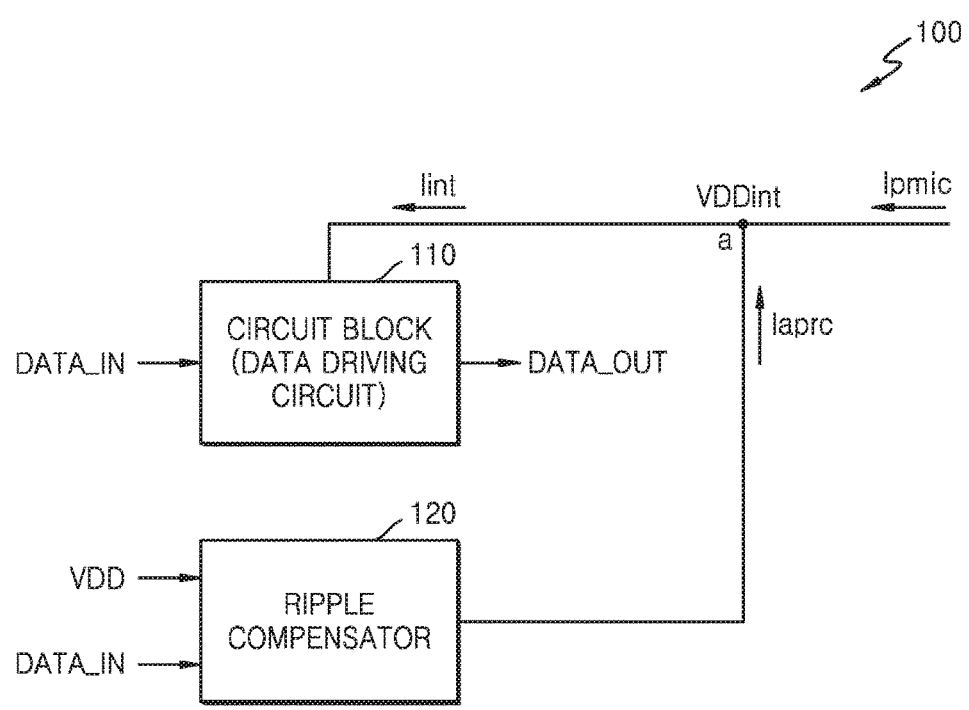
FIG. 1 is a block diagram of an example embodiment of a semiconductor device.

FIG. 1 is a block diagram of an example embodiment of a semiconductor device 100.

Semiconductor device 100 may include one or more circuit blocks (e.g., a complementary metal oxide semiconductor (CMOS) logic element or block, or a serial link, etc,) that operates with an operating voltage between a power supply voltage and a ground voltage to process a signal. As an example, semiconductor device 100 may include as a circuit block a receiver that processes data received from the outside of semiconductor device 100 and provides the processed data to another circuit block inside semiconductor device 100. Also, semiconductor device 100 may include as the circuit block a transmitter that processes data generated inside semiconductor device 100 and provides the processed data to the outside of semiconductor device 100. In addition, semiconductor device 100 may include various other circuit blocks that process input data input according to various frequencies. With the recognition that the circuit block consumes current due to switching current, in the following embodiments the circuit block may be referred to as a "current consumption circuit."

Referring to FIG. 1, semiconductor device 100 may include a circuit block 110 and a ripple compensator 120. Circuit block 110 is a signal processing circuit that performs signal processing according to a predetermined function. When circuit block 110 receives input data DATA_IN and processes the input data DATA_IN, circuit block 110 may be defined as a "data driving circuit" or a "data processing circuit."

Circuit block 110 receives the input data DATA_IN and generates output data DATA_OUT having a level change between a first power supply voltage VDDint and a ground voltage through a signal processing operation. As an example, circuit block 110 may include a CMOS logic element or circuit, such as a data driver, and may generate output data DATA_OUT having a logic low level or a logic high level according to a pattern of the input data DATA_IN.

Ripple compensator 120 may also receive the input data DATA_IN provided to circuit block 110. As an example, the input data DATA_IN may be provided, in parallel, to circuit block 110 and ripple compensator 120, and the edge (or transition) timing of the input data DATA_IN received by circuit block 110 and the edge timing of the input data DATA_IN received by ripple compensator 120 may be substantially the same as each other. Here and throughout this application, when times, timing, voltages, levels, etc. are said to be "substantially" the same as each other or substantially equal to each other, it means that the times, timings, voltages, levels, etc. are the same as each other within manufacturing tolerances due to variations in processes, components, tolerances, etc.

Ripple compensator 120 may receive a second power supply voltage VDD, and the second power supply voltage VDD may correspond to a power supply voltage different from the first power supply voltage VDDint. According to an embodiment, a voltage generator (not shown) for generating power supply voltages at various voltage levels may be provided in semiconductor device 100, and the first power supply voltage VDDint and the second power supply voltage VDD may be different from each other. The first power supply voltage VDDint and the second power supply voltage VDD may be electrically isolated from each other.

In addition, two or more different external power sources may be provided to semiconductor device 100, and semiconductor device 100 may generate a plurality of power supply voltages by using received external power sources. According to an embodiment, the first power supply voltage VDDint and the second power supply voltage VDD may be power supply voltages generated using different external power sources. Alternatively, the first power supply voltage VDDint and the second power supply voltage VDD may be power supply voltages generated using the same external power source. The first power voltage VDDint and the second power voltage VDD may have the same voltage level, or substantially the same voltage level, as each other, or may have different voltage levels than each other.

Semiconductor device 100 may be supplied with a power supply current (e.g., an AC+DC power supply current Ipmic) from an external Power Management Integrated Circuit (PMIC) (not shown). The first power supply voltage VDDint that is used as a driving voltage of circuit block 110 may be applied to a power supply voltage node "a" connected with or associated with circuit block 110. The level of the first power supply voltage VDDint may be influenced by the power supply current Ipmic and an impedance component in semiconductor device 100. In this case, when a consumption current Iint generated in circuit block 110 is supplied from the power supply current Ipmic, the level of the power supply current Ipmic may be drastically reduced depending on the pattern of the input data DATA_IN. As a result, a ripple may be generated in the first power supply voltage VDDint. In order to improve signal processing characteristics of circuit block 110, the ripple of the first power supply voltage VDDint should be reduced irrespective of the data pattern of the input data DATA_IN.

Ripple compensator 120 may provide a compensation signal (e.g., an alternating current (AC) compensation current Iaprc) to circuit block 110 via the power supply voltage node "a" to reduce the ripple of the first supply voltage VDDint. In general, the input data DATA_IN has data transition intervals therein when data level transitions occur in the input data DATA_IN (see, e.g., FIG. 5 described below). In that case, ripple compensator 120 may be configured to provide the compensation signal (e.g., compensation current Iaprc) to the first node "a" only during the data transition intervals. That is, according to an embodiment, ripple compensator 120 may selectively provide the compensation current Iaprc to circuit block 110 when a transition of the input data DATA_IN occurs. Accordingly, the consumption current Iint corresponding to the pattern of the input data DATA_IN may be generated in circuit block 110, and the consumption current Iint may be supplied from the compensation current Iaprc generated in ripple compensator 120. Beneficially, a level of the alternating current consumed by circuit block (e.g., data driving circuit) 110 and a level of the compensation current Iaprc generated by ripple compensator 120 are substantially equal to each other.

As an operation example, ripple compensator 120 may receive the input data DATA_IN, detect an edge (a rising edge and/or a falling edge) of the input data DATA_IN, and output a compensation current Iaprc to circuit block 110 based on a detection result. Alternatively, as another operation example, ripple compensator 120 may include at least one node (e.g., a compensation node) whose voltage level fluctuates in accordance with a level transition of the input data DATA_IN, and may provide a compensation current Iaprc, generated due to a level difference between a voltage of the compensation node and the first power supply voltage VDDint, to circuit block 110.

According to the above example embodiment, since the consumption current Iint generated in circuit block 110 may be supplied from the compensation current Iaprc of ripple compensator 120 using a separate power supply voltage VDD, the fluctuation level of the power supply current Ipmic may be reduced, and accordingly, the ripple of the first power supply voltage VDDint may be reduced. In addition, since the compensation current Iaprc may be selectively supplied to circuit block 110 only when a transition of the input data DATA_IN is generated, the ripple of the first power supply voltage VDDint may be reduced via a compensation operation that is performed a relatively low percentage of time and in which an additional large power consumption or generation is not required.

In addition to circuit block 110 shown in FIG. 1, semiconductor device 100 may include a plurality of circuit blocks as a predetermined signal processing unit. According to an embodiment, some of the circuit blocks may operate at different operating frequencies from other circuit blocks. According to an embodiment, a ripple compensator 120 may be arranged corresponding to each of circuit blocks. In this case, since ripple compensator 120 receives the same input data as that of a circuit block arranged corresponding thereto, ripple compensator 120 may perform a compensation operation corresponding to an operation frequency of each circuit block.

In the above-described embodiment, the configuration shown in FIG. 1 corresponds to a semiconductor device and circuit block 110 corresponds to a data driving circuit. However, various configurations may be variously defined in various embodiments. For example, the configuration shown in FIG. 1 may correspond to a data driving circuit, circuit block 110 may correspond to a data driver, and ripple compensator 120 may be included in the data driving circuit. Alternatively, circuit block 110 may correspond to a data driving circuit or a data driver, and ripple compensator 120 may be arranged outside the data driving circuit or the data driver.

Figure 2:
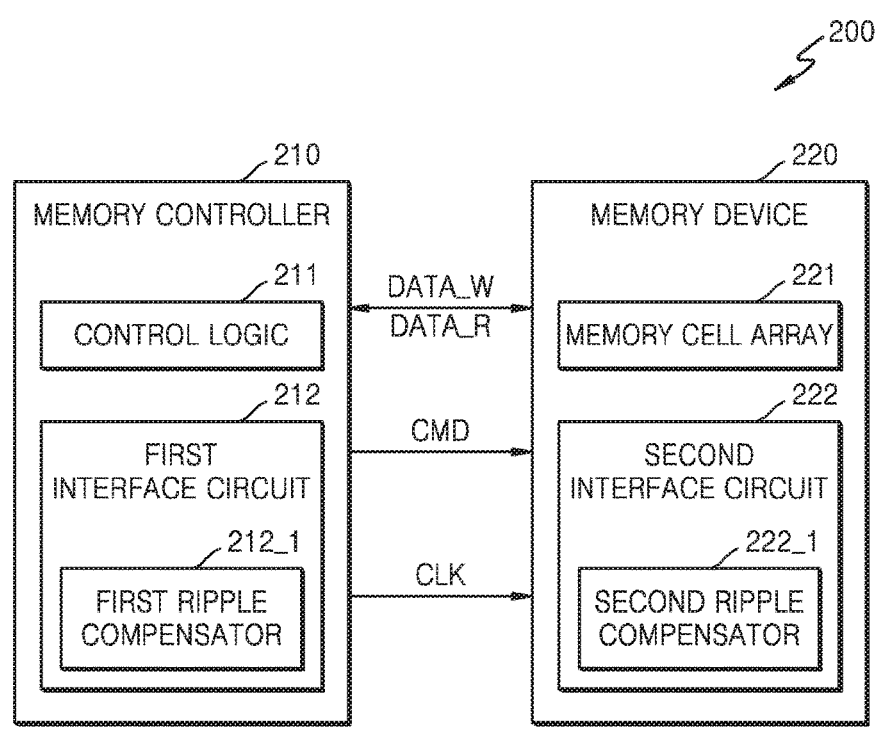
FIG. 2 is a block diagram of an embodiment of a semiconductor system.

FIG. 2 is a block diagram of an embodiment of a semiconductor system. In FIG. 2, the semiconductor system may correspond to a memory system 200, and memory system 200 may include a memory controller 210 and a memory device 220.

Memory device 220 may include one of various memories. For example, memory device 220 may include a volatile memory, and the volatile memory may be Dynamic Random Access Memory (DRAM), such as Double Data Rate Synchronous Dynamic Random Access Memory (DDR SDRAM), Low Power Double Data Rate (LPDDR) SDRAM, Graphics Double Data Rate (GDDR) SDRAM, or Rambus Dynamic Random Access Memory (RDRAM).

Alternatively, memory device 220 may include a nonvolatile memory that retains stored data even when power is turned off. As an example, the nonvolatile memory may include a NAND flash memory or a NOR flash memory, or may include one of various non-volatile memories, such as magnetic random access memory (MRAM), resistance RAM (RRAM), ferroelectric RAM (FRAM), and Phase Change Memory (PCM).

Memory controller 210 may include control logic 211 and a first interface circuit 212, and may provide various signals to memory device 220 via first interface circuit 212 and control memory operations, such as a write operation and a read operation, for memory device 220. For example, memory controller 210 may provide a command CMD for controlling a memory operation to memory device 220 via first interface circuit 212. Also, memory controller 210 may provide a clock signal CLK to memory device 220 via first interface circuit 212, and may also provide write data DATA_W to memory device 220 or receive read data DATA_R from memory device 220.

Memory device 220 may include a memory cell array 221 and a second interface circuit 222. Memory device 220 may receive the command CMD and the clock signal CLK from memory controller 210 via second interface circuit 222. Memory device 220 may also receive the write data DATA_W or provide the read data DATA_R to memory controller 210 via second interface circuit 222.

According to an embodiment, each of first interface circuit 212 and second interface circuit 222 may include a data driving circuit (not shown) for processing data to be transmitted or transmitted data. According to the above-described embodiment, in order to reduce a ripple of a power supply voltage generated in the data driving circuit, first interface circuit 212 may include a first ripple compensator 212_1 and second interface circuit 222 may include a second ripple compensator 222_1.

According to an embodiment, first interface circuit 212 may include a plurality of data driving circuits, and first ripple compensator 212_1 may be arranged corresponding to each of the data driving circuits. Second interface circuit 222 may include a plurality of data driving circuits, and second ripple compensator 222_1 may be arranged corresponding to each of the data driving circuits. In addition, each of first interface circuit 212 and second interface circuit 222 may include circuit blocks for processing the command CMD and the clock signal CLK, and first ripple compensator 212_1 and second ripple compensator 222_1 may be arranged corresponding to the circuit blocks for processing the command CMD and the clock signal CLK.

According to an embodiment, first interface circuit 212 may include a data transmitter as a data driving circuit, and first ripple compensator 212_1 may be arranged corresponding to the data transmitter. In a data write operation, the write data DATA_W in memory controller 210 may be provided, in parallel, to the data transmitter and first ripple compensator 212_1, and first ripple compensator 212_1 may detect an edge of the write data DATA_W and thus provide a compensation current to a power supply voltage node of the data transmitter. That is, first ripple compensator 212_1 may selectively provide a compensation current to the power supply voltage node of the data transmitter when a transition occurs according to a pattern of the write data DATA_W.

Second interface circuit 222 of memory device 220 may include a data receiver as a data driving circuit, and the write data DATA_W provided from memory controller 210 may be provided, in parallel, to the data receiver and second ripple compensator 222_1. Second ripple compensator 222_1 may detect an edge of the write data DATA_W and thus provide a compensation current to a power supply voltage node of the data receiver of second interface circuit 222.

Similarly, in the case of a data read operation, second interface circuit 222 of memory device 220 may include a data transmitter as a data driving circuit, and the read data DATA_R read from memory cell array 221 of memory device 220 may be provided, in parallel, to the data transmitter and second ripple compensator 222_1. Second ripple compensator 222_1 may detect an edge of the read data DATA_R and thus provide a compensation current to a power supply voltage node of the data transmitter. First interface circuit 212 of memory controller 210 may include a data receiver for receiving the read data DATA_R and a first ripple compensator 212_1 corresponding to the data receiver. The read data DATA_R may be provided, in parallel, to the data receiver and first ripple compensator 212_1, and the compensation current generation operation according to the above-described embodiments may be performed.

Figure 3:
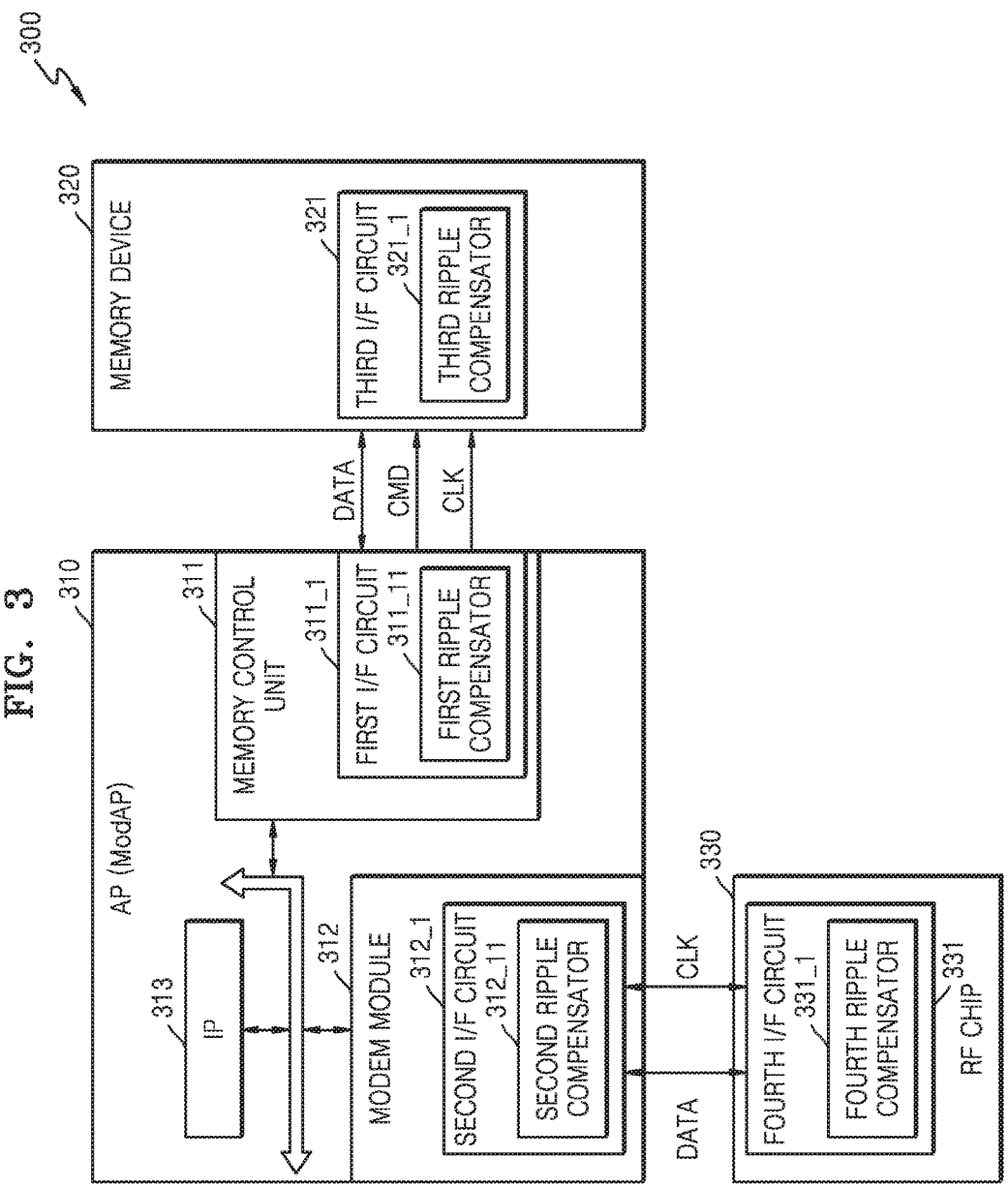
FIG. 3 is a block diagram of an example embodiment of a data processing system including an application processor.

FIG. 3 is a block diagram of an embodiment of a data processing system 300 including an application processor 310.

As an example of a semiconductor device for driving data, application processor 310 may communicate with one or more peripheral devices, and application processor 310 may be implemented as a system on chip (SoC). Data processing system 300 may include a memory device 320 and a radio frequency (RF) chip 330 as one or more peripheral devices, as well as application processor 310. Although not shown in FIG. 3, other types of peripheral devices may be further included in data processing system 300. Data processing system 300 of FIG. 3 may be any of various electronic devices. As an example, data processing system 300 may be a personal computer (PC), a data server, a network-attached storage (NAS), an Internet of Things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

The SoC may include a system bus (not shown) operating according to a protocol having a predetermined standard bus specification, and may include various intellectual property (IP) blocks connected to the system bus. As a standard specification of the system bus, an Advanced Microcontroller Bus Architecture (AMBA) protocol of Advanced RISC Machine (ARM) may be applied. Examples of a bus type of the AMBA protocol may include Advanced High-Performance Bus (AHB), Advanced Peripheral Bus (APB), Advanced eXtensible Interface (AXI), AXI4, AXI Coherency Extensions (ACE), and the like. Other types of protocols, such as uNetwork of SONICs Inc., CoreConnect of IBM, and Open Core Protocol of OCP-IP, may also be applied.

Application processor 310 may include a memory control unit 311. Also, application processor 310 may further include a modem module 312, and may be referred to as a ModAP as application processor 310 performs a modem function. In addition, application processor 310 may further include one or more intellectual property cores (hereinafter referred to as "IPs") 313.

Memory control unit 311 may interface with memory device 320, and modem module 312 may interface with RF chip 330 as an external chip. Memory control unit 311 may include a first interface circuit 311_1, and first interface circuit 311_1 may include a first ripple compensator 311_11 according to the embodiment described above. Similarly, modem module 312 may include a second interface circuit 312_1, and second interface circuit 312_1 may include a second ripple compensator 312_11 according to the embodiment described above. Although not shown, IP 313 may also interface with an external device, and a ripple compensator according to an embodiment of the inventive concept may be provided in IP 313.

Memory device 320 may include a third interface circuit 321 that interfaces with application processor 310, and third interface circuit 321 may include a third ripple compensator 321_1 according to the embodiment described above. RF chip 330 may include a fourth interface circuit 331 that interfaces with application processor 310, and fourth interface circuit 331 may include a fourth ripple compensator 331_1 according to the embodiment described above.

First ripple compensator 311_1 of memory control unit 311 and third ripple compensator 321_1 of memory device 320 may perform a ripple compensation operation according to the embodiment described above in connection with a signal processing of at least one of various signals related to a memory operation. For example, first interface circuit 311_1 of memory control unit 311 may include one or more data driving circuits for driving data DATA (e.g., write data DATA), and first ripple compensator 311_1 may be arranged corresponding to each of the data driving circuits. Similarly, third interface circuit 321 of memory device 320 may include one or more data driving circuits for driving data DATA (e.g., read data DATA), and third ripple compensator 321_1 may be arranged corresponding to each of the data driving circuits of memory device 320.

Second interface circuit 312_1 of modem module 312 may transmit or receive a baseband signal to or from RF chip 330. As an example, second interface circuit 312_1 of modem module 312 may transmit or receive baseband data DATA and a clock signal CLK to or from RF chip 330. According to an embodiment of the inventive concept, second interface circuit 312_1 may include one or more data driving circuits for processing baseband data DATA, and second ripple compensator 312_11 may be arranged corresponding to each of the data driving circuits of second interface circuit 312_1. Similarly, fourth interface circuit 331 may include one or more data driving circuits for processing baseband data DATA transmitted or received to or from modem module 312, and fourth ripple compensator 331_1 may be arranged corresponding to each of the data driving circuits of RF chip 330.

Figure 4:
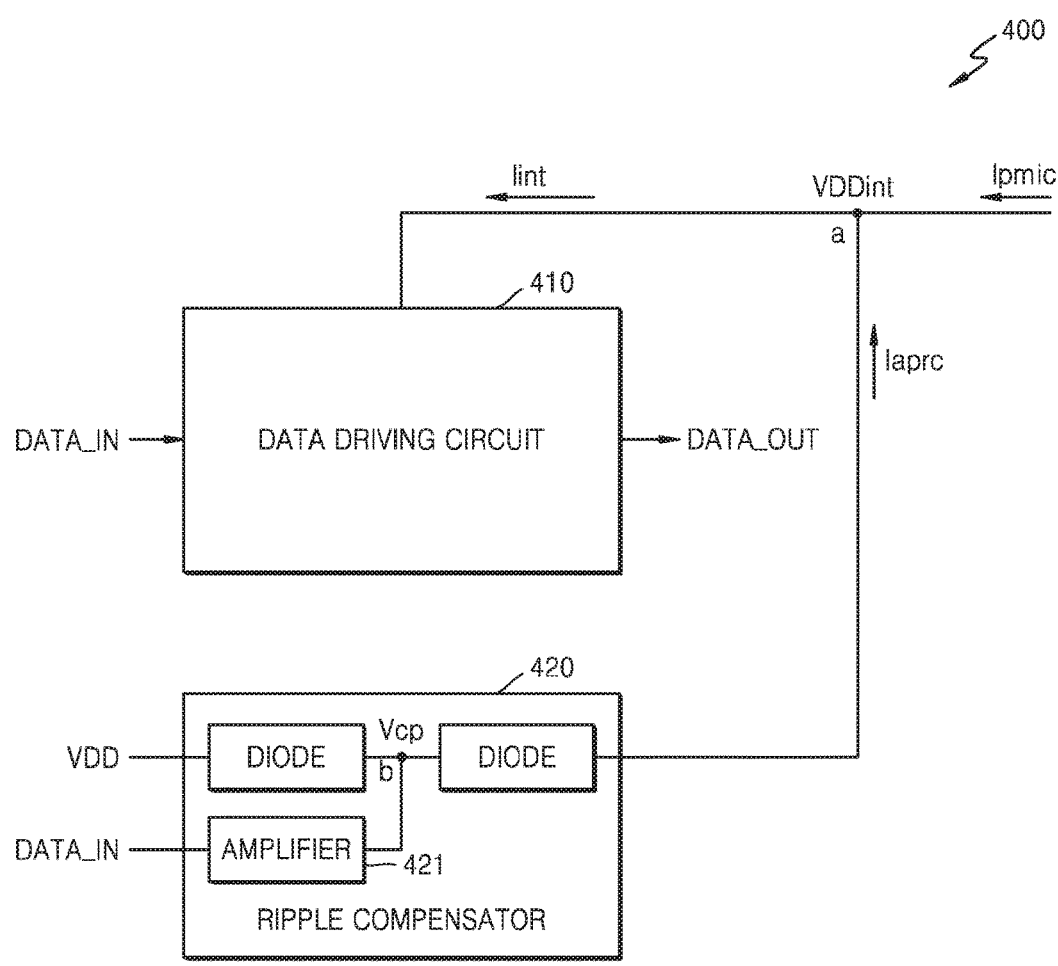
FIGS. 4 and 5 are, respectively, a block diagram and a circuit diagram of an embodiment of a semiconductor device including a ripple compensator.
Figure 5:
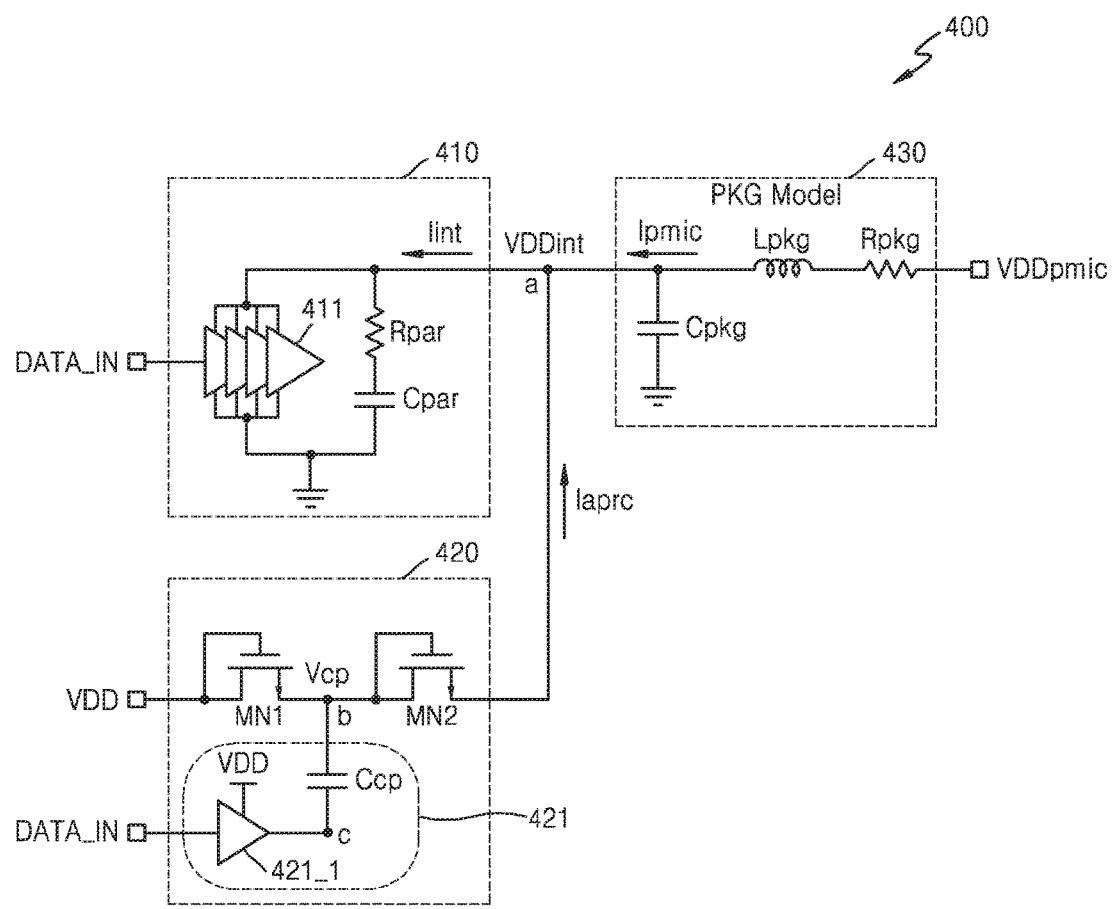

Hereinafter, specific examples of an embodiment of a ripple compensator are described. FIGS. 4 and 5 are, respectively, a block diagram and a circuit diagram of a semiconductor device 400 including an embodiment of a ripple compensator.

Referring to FIG. 4, semiconductor device 400 may include a data driving circuit 410 as a circuit block in which a consumption current Iint is generated as described above, and a ripple compensator 420 arranged corresponding to data driving circuit 410. Data driving circuit 410 may perform a signal processing operation on input data DATA_IN and generate output data DATA_OUT of which a voltage level may be changed between a first power supply voltage VDDint applied to a power supply voltage node "a" and a ground voltage. A power supply current Ipmic may be supplied to data driving circuit 410 via the power supply voltage node "a," and the consumption current Iint of data driving circuit 410 may be generated according to a pattern of the input data DATA_IN. As the input data DATA_IN has an irregular pattern, a level of the power supply current Ipmic may fluctuate irregularly, thereby causing a ripple in which a level of the first power supply voltage VDDint fluctuates.

Ripple compensator 420 may receive the input data DATA_IN and a second power supply voltage VDD. The second power supply voltage VDD may be a voltage generated separately from the first power supply voltage VDDint provided to data driving circuit 410 as in the above-described embodiment. Ripple compensator 420 may include a compensation node "b" located therein and may include an amplifier 421 for amplifying a level of a compensation voltage Vcp applied to the compensation node "b." Ripple compensator 420 may further include one or more circuit devices for controlling a current direction of the compensation current Iaprc. As an example, in FIG. 4, ripple compensator 420 may include a diode connected between the second power supply voltage VDD and the compensation node "b" and a diode connected between the compensation node "b" and the power supply voltage node "a." Accordingly, the compensation current Iaprc may be transferred in one direction from ripple compensator 420 to the power supply voltage node "a."

The input data DATA_IN may have a logic low state or a logic high state according to a data pattern and the compensation voltage Vcp may have a level corresponding to the second power supply voltage VDD. Amplifier 421 may perform an amplification operation according to a pattern of the input data DATA_IN. For example, amplifier 421 may amplify a level of the compensation voltage Vcp in response to a timing at which the input data DATA_IN varies from a logic low state to a logic high state. Accordingly, a level difference between an amplified compensation voltage Vcp and the first power supply voltage VDDint may occur, and a compensation current Iaprc according to the level difference may be provided to the power supply voltage node "a." That is, even if a consumption current Iint is generated in data driving circuit 410 according to the pattern of the input data DATA_IN, a variation in the level of the power supply current Ipmic may be reduced by the compensation current Iaprc, and accordingly, a ripple of the first power supply voltage VDDint may be reduced or eliminated. Beneficially, a level of the alternating current consumed by data driving circuit 410 and a level of the compensation current Iaprc generated by ripple compensator 420 are substantially equal to each other. In that case, the consumption current Iint is supplied at least in part from the compensation current Iaprc generated by ripple compensator 420.

Figure 6:
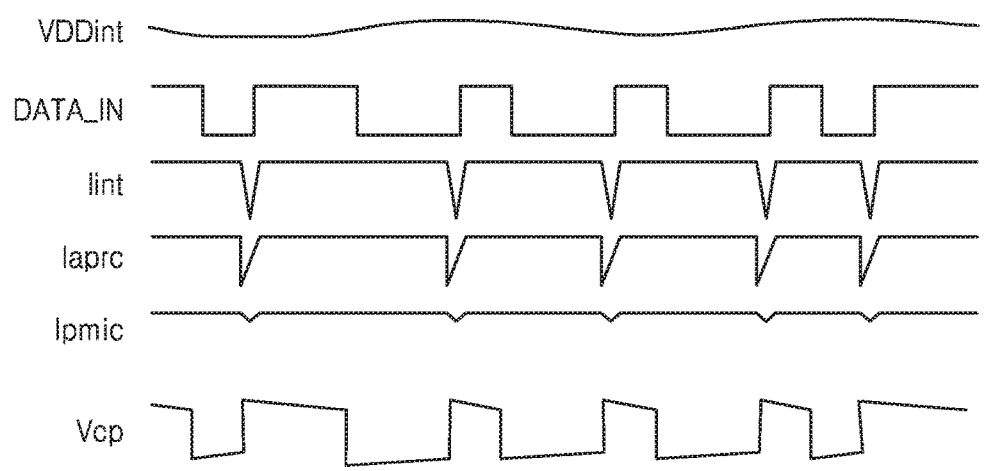
FIG. 6 is a waveform diagram illustrating waveforms of various signals of the ripple compensator shown in FIG. 5.

A more specific configuration and operation of the ripple compensator of FIG. 4 will be described with reference to FIGS. 5 and 6. FIG. 6 is a waveform diagram illustrating waveforms of various signals according to the ripple compensator shown in FIG. 5.

Referring to FIG. 5, data driving circuit 410 may include one or more data drivers 411 that receive input data DATA_IN, and data drivers 411 may be connected between the first power supply voltage VDDint and the ground voltage. In FIG. 5, a parasitic resistance component Rpar and a parasitic capacitor component Cpar formed in data driving circuit 410 are further shown.

Semiconductor device 400 may be implemented as a semiconductor package, and an LRC component according to a package model PKG Model may be present. A resistance component Rpkg, an inductance component Lpkg, and a capacitance component Cpkg according to the package model PKG Model is shown in FIG. 5, and a power supply current Ipmic according to a voltage VDDpmic from an external power source may be provided to data driving circuit 410 via the power supply voltage node "a." When a consumption current Iint is generated in data driving circuit 410 as described above, a ripple may occur in the first power supply voltage VDDint applied to the power supply voltage node "a," primarily due to the inductance component Lpkg of the package model PKG Model.

According to an embodiment, ripple compensator 420 may be electrically connected to the power supply voltage node "a," and an electrical path from ripple compensator 420 to the power supply voltage node "a" may be referred to as a compensation path. Ripple compensator 420 may include first and second transistors MN1 and MN and amplifier 421 may include one or more buffers 421_1 and a compensation capacitance device (e.g., capacitor Ccp). The second power supply voltage VDD may be provided to the compensation node "b" via the first transistor MN1 that is a diode-connected transistor. The compensation node b may be connected to the power supply voltage node "a" via the second transistor MN2. The second power supply voltage VDD provided to ripple compensator 420 may be used as a driving voltage for driving buffer 421_1.

Ripple compensator 420 may generate a compensation current (or compensation charge) Iaprc by using the second power supply voltage VDD different from the first power supply voltage VDDint that is a driving voltage of data driving circuit 410, and may compensate for a ripple of the first power supply voltage VDDint by supplying the compensation current Iaprc to the power supply voltage node "a." In addition, ripple compensator 420 may generate a compensation current by a charge pump method using buffer 421_1 and the compensation capacitor Ccp.

As an operation example, when a threshold voltage of the first transistor MN1 corresponds to Vth1, the compensation voltage Vcp applied to the compensation node "b" has a level corresponding to VDD−Vth1. As a voltage level of the input data DATA_IN transitions from a logic low to a logic high at a rising edge of the input data DATA_IN, a voltage level of an output node "c" of buffer 421_1 (or an electrode of the compensation capacitor Ccp) may increase. For example, when buffer 421_1 is driven by the second power supply voltage VDD, a voltage level of the output node "c" may increase by the level of the second power supply voltage VDD. In addition, a voltage level of the compensation node "b" may increase by the compensation capacitor Ccp. For example, the compensation voltage Vcp may increase to a level corresponding to VDD−Vth1+VDD. This may be referred to as a charge pump operation. Accordingly, due to a voltage level difference between the power supply voltage node "a" and the compensation node "b," the compensation current Iaprc may be provided to data driving circuit 410 through the second transistor MN2 and the power supply voltage node "a."

Thereafter, as the voltage level of the input data DATA_IN transitions from a logic high to a logic low at a falling edge of the input data DATA_IN, the level of the compensation voltage Vcp may return to VDD−Vth1 and thus the supply of the compensation current Iaprc to the power supply voltage node "a" may be stopped.

FIG. 6 illustrates waveforms of various signals corresponding to the operation described in the embodiment of FIG. 5. As shown in FIG. 6, the consumption current Iint of data driving circuit 410 may increase at the rising edge of the input data DATA_IN, and thus, a ripple of the first power supply voltage VDDint may be caused. However, the level of the compensation voltage Vcp may vary based on a pattern of the input data DATA_IN according to an embodiment of the inventive concept, and accordingly, the compensation current Iaprc may be generated. According to the embodiment described above, an instantaneous AC current consumed by data driving circuit 410 may not be supplied from the power supply current Ipmic but may be supplied from the compensation current Iaprc generated by the ripple compensator. Thus, the fluctuation level of the power supply current Ipmic may be reduced, and the ripple of the first power supply voltage VDDint may be reduced.

In the embodiment of FIG. 5, the second power supply voltage VDD provided to one electrode of the first transistor MN1 is used as a driving voltage of buffer 421_1. However, the embodiment of the inventive concept is not limited thereto. For example, a power supply voltage provided to one electrode of the first transistor MN1 and a power supply voltage used as the driving voltage of buffer 421_1 may be different types of power supply voltages, and voltage levels of the power supply voltages may be different from each other.

Figure 7:
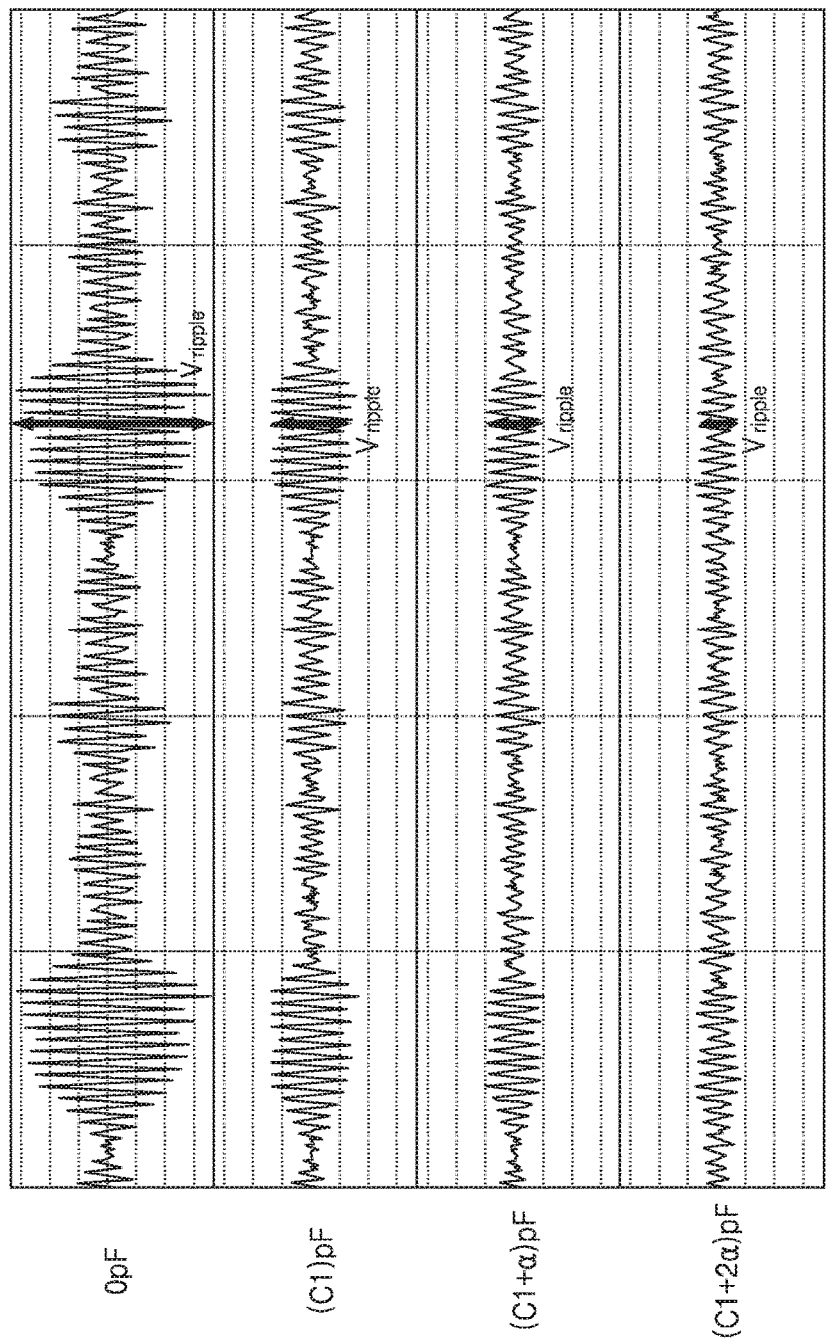
FIG. 7 is a waveform diagram illustrating an example in which a ripple of a power supply voltage is reduced in a case where an embodiment of a ripple compensator is applied.

FIG. 7 is a waveform diagram illustrating an example in which a ripple of a power supply voltage is reduced in a case where a ripple compensator is applied.

Referring to FIGS. 5 and 7, the size of the compensation capacitor Ccp may determine the amount of compensation current Iaprc provided to the power supply voltage node "a." FIG. 7 illustrates waveforms representing the degree of ripple generated in the power supply voltage according to the size (or capacitance) of the compensation capacitor Ccp. For example, ripple characteristic in the case where the capacitance corresponds to 0, C1, C1+α, or C1+2α are illustrated in FIG. 7.

In the waveform diagram shown in FIG. 7, the horizontal axis represents time and the vertical axis represents the level of the power supply voltage VDDint. First, the case where the capacitance corresponds to 0 pF corresponds to a case where a ripple compensator is not applied. In this case, as shown in FIG. 7, the amount of ripple generated in the first power supply voltage VDDint may be relatively large. On the other hand, when the ripple compensator is applied, the amount of ripple generated in the first power supply voltage VDDint may be reduced. For example, when a compensation capacitor Ccp having a relatively small capacitance C1 is applied, the amount of ripple compensation provided by the compensation current Iaprc may be relatively small, and accordingly, the degree of reduction of a ripple generated in the first power supply voltage VDDint may be relatively small. On the other hand, when a compensation capacitor Ccp having a relatively large capacitance C1+2α is applied, the amount of compensation provided by the compensation current Iaprc may be relatively large, and accordingly, the degree of reduction of a ripple generated in the first power supply voltage VDDint may be relatively large. The size of a ripple generated in the first power supply voltage VDDint may vary depending on a package model of a semiconductor device and the like. Thus, the size of a ripple generated in the first power supply voltage VDDint may be measured through a pre-shipment test of the semiconductor device, and the capacitance of the compensation capacitor Ccp may be determined based on the measurement result.

Figure 8:
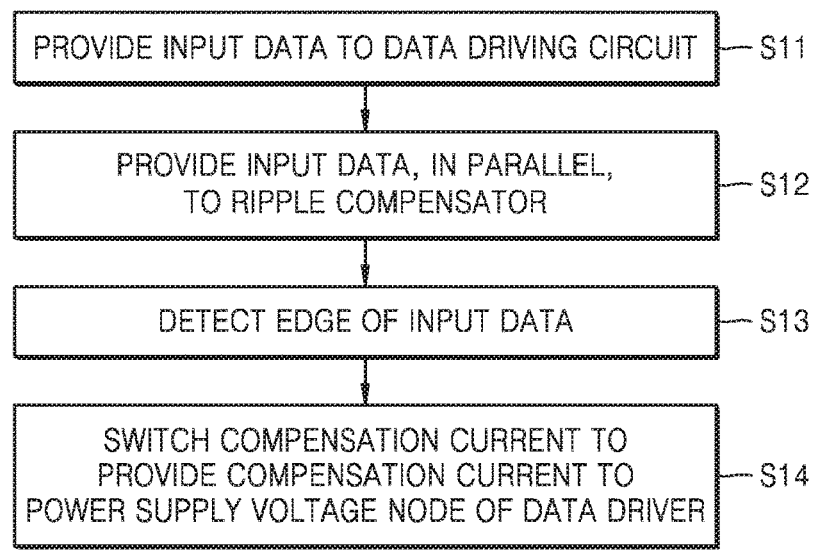
FIGS. 8 and 9 are flowcharts of an example embodiment of a method of operating a data driving circuit.
Figure 9:
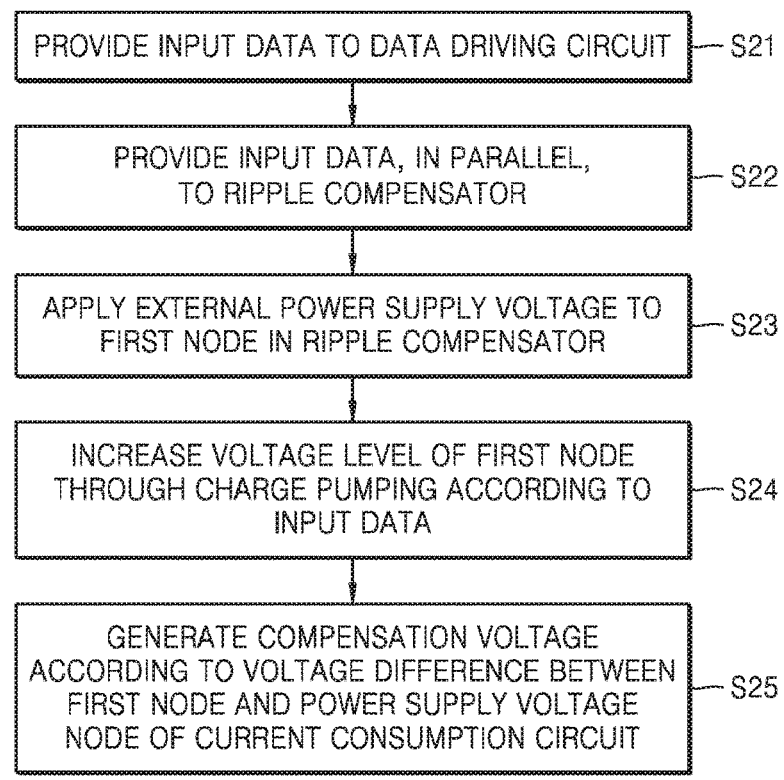

FIGS. 8 and 9 are flowcharts of an embodiment of a method of operating a data driving circuit. In explaining the embodiment of FIGS. 8 and 9, it is assumed that the data driving circuit includes a data driver and a ripple compensator according to the above-described embodiment.

Referring to FIG. 8, input data may be provided to a data driving circuit (Operation S11). The input data may be provided to a data driver in the data driving circuit, and the data driver may generate a consumption current according to a pattern of the input data. In addition, the input data may be provided, in parallel, to a ripple compensator associated with or connected with the data driver of the data driving circuit (Operation S12). Since the same data is provided, in parallel, to the data driver and the ripple compensator, the ripple compensator may detect an edge according to the pattern of the received input data (Operation S13), from which a timing at which a change (e.g., increase) in the consumption current is generated in the data driver may be detected.

The ripple compensator may include a circuit that performs switching according to the pattern of the input data, and may also include a current source that generates a compensation current (or a compensation charge) and provides the compensation current to a power supply voltage node of the data driver. According to an embodiment, the ripple compensator may include a switch that is turned on or off in response to an edge of the input data. More specifically, when a large amount of consumption current is generated at a rising edge of the input data in the data driver, the switch of the ripple compensator may switch on the compensation current in response to the rising edge of the input data. That is, the ripple compensator may switch on the compensation current and provide the compensation current to the power supply voltage node of the data driver (Operation S14).

Referring to FIG. 9, input data may be provided to a data driving circuit (Operation S21). The input data may be provided to a data driver associated with or connected with the data driver of the data driving circuit. In addition, the input data may be provided, in parallel, to a ripple compensator in the data driving circuit (Operation S22). Also, the ripple compensator may include one or more buffers, and may be provided with a power supply voltage (e.g., an external power supply voltage) that is different from a power supply voltage of the data driver. The external power supply voltage may be applied to a compensation node in the ripple compensator (Operation S23).

The ripple compensator may generate a compensation current based on a charge pump operation. As an example, the ripple compensator may include a compensation capacitor connected to the compensation node, and a voltage level of the compensation node may increase based on a charge pump operation, according to a pattern of input data provided to the ripple compensator (Operation S24). In addition, according to the charge pump operation, the level of a voltage of the compensation node may be higher than that of a voltage applied to a power supply voltage node of the data driver. Accordingly, a voltage level difference may occur between the compensation node and the power supply voltage node of the data driver, and a compensation current according to the voltage level difference may be provided to the power supply voltage node.

As described above, according to embodiments of the inventive concept, a consumption current generated in a current consumption circuit may be supplied through a compensation current generated due to a different type of power supply. In addition, since a ripple of a power supply voltage may be reduced according to the embodiment described above, a ripple compensator according to an embodiment of the inventive concept may be employed in various types of logic circuits for processing data, for example, a serializer, a driver, and a clock and data recovery (CDR) circuit, etc.

Various circuit implementations of an embodiment of a ripple compensator and a semiconductor device including the ripple compensator will be described below.

Figure 10:
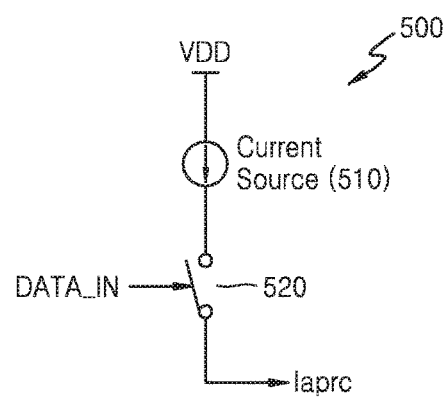
FIG. 10 is a circuit diagram of an example embodiment of a ripple compensator.

FIG. 10 is a circuit diagram of an embodiment of a ripple compensator 500.

Referring to FIG. 10, ripple compensator 500 may be electrically connected to various circuit blocks provided in a semiconductor device. For example, ripple compensator 500 may be connected to one node of a power supply line that transmits a power supply voltage to the circuit blocks. Ripple compensator 500 may also include a current source 510 and a switch 520, and a compensation current Iaprc from current source 510 may be provided to a corresponding circuit block (or a circuit block in which a ripple is to be compensated) via switch 520. Ripple compensator 500 may be driven by a power supply voltage VDD, and the power supply voltage VDD may correspond to a power supply voltage that is different from a power supply voltage (not shown) used in a corresponding circuit block.

Similar to the above-described embodiment, ripple compensator 500 may receive the same input data DATA_IN as a corresponding circuit block. In addition, switch 520 may perform a switch operation corresponding to a data pattern of the input data DATA_IN. For example, in response to a rising edge of the input data DATA_IN, switch 520 may be changed from an off state to an on state. In addition, as switch 520 is turned on, the compensation current Iaprc from current source 510 may be provided to a corresponding circuit block, and a consumption current of the circuit block, which is generated at a timing that is substantially the same as a timing at which switch 520 is turned on, may be supplied from the compensation current Iaprc.

In the embodiment shown in FIG. 10, switch 520 is described as being turned on in response to a rising edge of the input data DATA_IN. However, the embodiment of the inventive concept is not limited thereto. As an example, switch 520 may be implemented such that switch 520 is turned on in response to a falling edge of the input data DATA_IN. Alternatively, an additional switch (not shown) may be further provided and thus switch 520 may be implemented such that switch 520 is turned on at both a rising edge and a falling edge of the input data DATA_IN. If current consumption occurs in a circuit block both during a rising transition and a falling transition of the input data DATA_IN, a ripple may be compensated for during both the rising transition and the falling transition of the input data DATA_IN.

Figure 11:
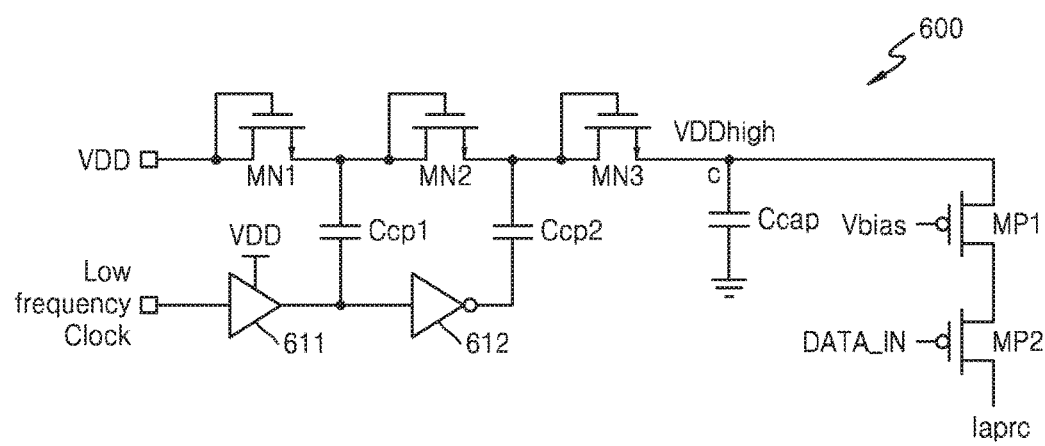
FIG. 11 is a circuit diagram of another example embodiment of a ripple compensator.

FIG. 11 is a circuit diagram of a ripple compensator 600 according to another example embodiment of the inventive concept.

Referring to FIG. 11, ripple compensator 600 may include various circuit devices for generating a compensation current according to the above-described embodiment. As an example, ripple compensator 600 may include one or more buffers (or inverters), one or more compensation capacitors Ccp1 and Ccp2, one or more NMOS transistors MN1, MN2, and MN3, a capacitor Ccap connected to a high voltage node "c" to which a high voltage is applied, and one or more PMOS transistors MP1 and MP2 for driving current. As an example, ripple compensator 600 may include a buffer 611 receiving a low frequency clock signal and an inverter 612 connected to an output of buffer 611. As an example, each of the one or more NMOS transistors MN1, MN2, and MN3 may have a diode connection structure and may also be connected in series between a power supply voltage VDD and the high voltage node "c." One node of a first compensation capacitor, i.e., the compensation capacitor Ccp1, may be connected to a node between the NMOS transistors MN1 and MN2, and one node of a second compensation capacitor, i.e., the compensation capacitor Ccp2, may be connected to a node between the NMOS transistors MN2 and MN3.

As in the above-described embodiment, a boosting operation may be performed by the compensation capacitors Ccp1 and Ccp2 according to a driving operation of buffer 611 and inverter 612, and accordingly, the level of a voltage VDDhigh applied to the high voltage node "c" may increase. A compensation current Iaprc may be generated through a first PMOS transistor, i.e., the PMOS transistor MP1, operating as a current source, and the compensation current Iaprc may be provided to a corresponding circuit block by a switching operation of a second PMOS transistor, i.e., the PMOS transistor MP2, which is responsive to input data DATA_IN, and thus may reduce a ripple generated in a power supply voltage of the circuit block.

Figure 12:
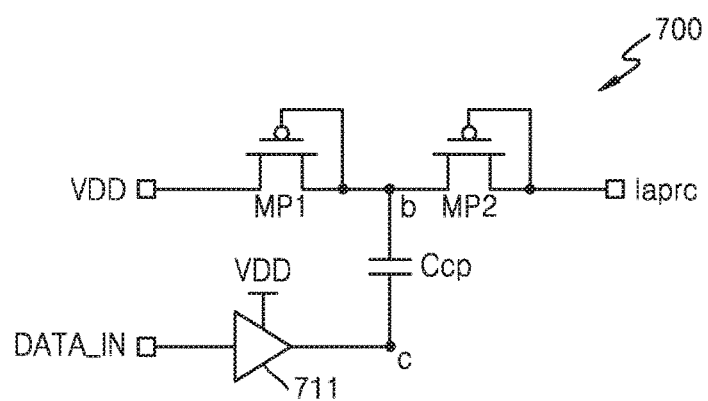
FIG. 12 is a circuit diagram of another example embodiment of a ripple compensator including PMOS transistors.

FIG. 12 is a circuit diagram of a ripple compensator 700 using PMOS transistors, according to another embodiment of the inventive concept.

Referring to FIG. 12, ripple compensator 700 may include first and second PMOS transistors MP1 and MP2, and ripple compensator 700 may also include one or more buffers 711 and a compensation capacitor Ccp. Each of the first and second PMOS transistors MP1 and MP2 may have a diode connection structure, and a power supply voltage VDD may be provided to a compensation node "b" via the first PMOS transistor MP1. The compensation node "b" may also be connected to a power supply voltage node of a corresponding circuit block via the second PMOS transistor MP2.

According to the embodiment shown in FIG. 12, since the level of the threshold voltage of the first and second PMOS transistors MP1 and MP2 is less than that of NMOS transistors, a reduction in the level of a compensation voltage applied to the compensation node "b" may be minimized. In addition, the level of the compensation voltage may increase by the compensation capacitor Ccp, and a reduction in a current level of a compensation current Iaprc that is transferred through the second PMOS transistor MP2 may be minimized.

Figure 13:
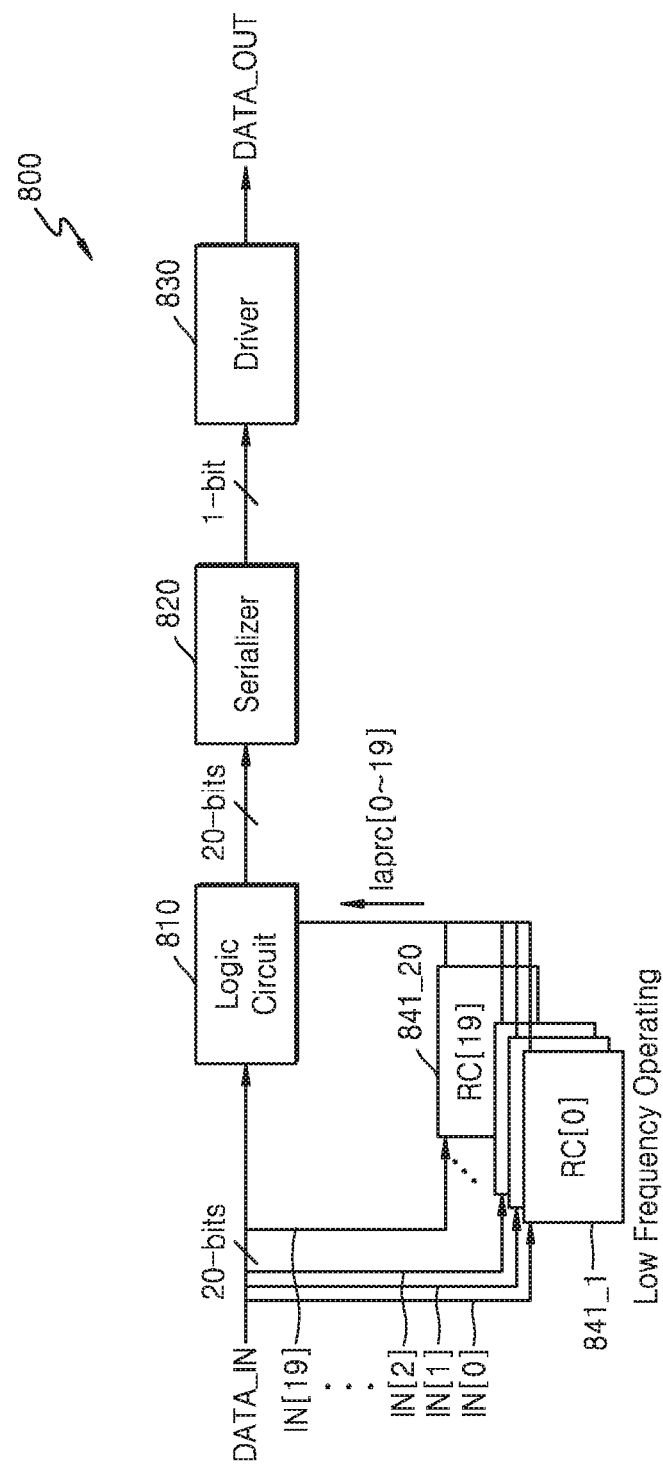
FIG. 13 is a block diagram of a semiconductor device showing an example of ripple compensation in a case where input data corresponds to parallel data.

FIG. 13 is a block diagram of a semiconductor device 800 showing an example of ripple compensation in a case where input data corresponds to parallel data. In FIG. 13, an example in which input data DATA_IN corresponds to 20-bit parallel data is illustrated. However the same principles described below may be applied when the number of bits of parallel data is more than or less than 20.

Referring to FIG. 13, semiconductor device 800 may include various circuit blocks, for example, a logic circuit 810, a serializer 820, and a driver 830. In addition, semiconductor device 800 may include one or more ripple compensators according to the embodiments described above, and an example in which a ripple compensator is arranged corresponding to each data bit is shown in FIG. 13. Accordingly, semiconductor device 800 may further include first to twentieth ripple compensators 841_1 to 841_20.

Driver 830 may correspond to the data driver or the data driving circuit in the above-described embodiment. Logic circuit 810 may receive input data DATA_IN corresponding to 20-bit parallel data IN[0] to IN[19] and may be driven by a relatively low operating frequency. For example, logic circuit 810 may receive input data DATA_IN through 20 data lines, and each of the data lines may have a data pattern according to corresponding input data DATA_IN. That is, the input data DATA_IN provided through the 20 data lines may have different data patterns for each data line.

According to an embodiment, first to twentieth ripple compensators 841_1 to 841_20 may be arranged corresponding to the 20-bit parallel data IN[0] to IN[19], and each of first to twentieth ripple compensators 841_1 to 841_20 may provide a compensation current Iaprc to a circuit block that processes input data DATA_IN of a corresponding data line. For example, logic circuit 810 may include 20 circuit blocks to process the 20-bit parallel data IN[0] to IN[19], respectively, and each of first to twentieth ripple compensators 841_1 to 841_20 may compensate for a ripple of a power supply voltage generated in a corresponding circuit block. That is, first to twentieth ripple compensators 841_1 to 841_20 may respectively provide compensation currents Iaprc [0-19] to corresponding circuit blocks at different timings.

Serializer 820 may receive and process the 20-bit parallel data IN[0] to IN[19] to generate serial data. That is, serializer 820 may sequentially provide data bit by bit to driver 830. Driver 830 may generate output data DATA_OUT through the processing operation according to the embodiments described above.

In the example shown in FIG. 13, the 20-bit parallel data IN[0] to IN[19] have been described. However, according to an embodiment of the inventive concept, M ripple compensators may be arranged corresponding to a logic circuit for processing M-bit parallel data. According to another embodiment, fewer than M ripple compensators may be arranged corresponding to some of the M-bit parallel data.

Figure 14:
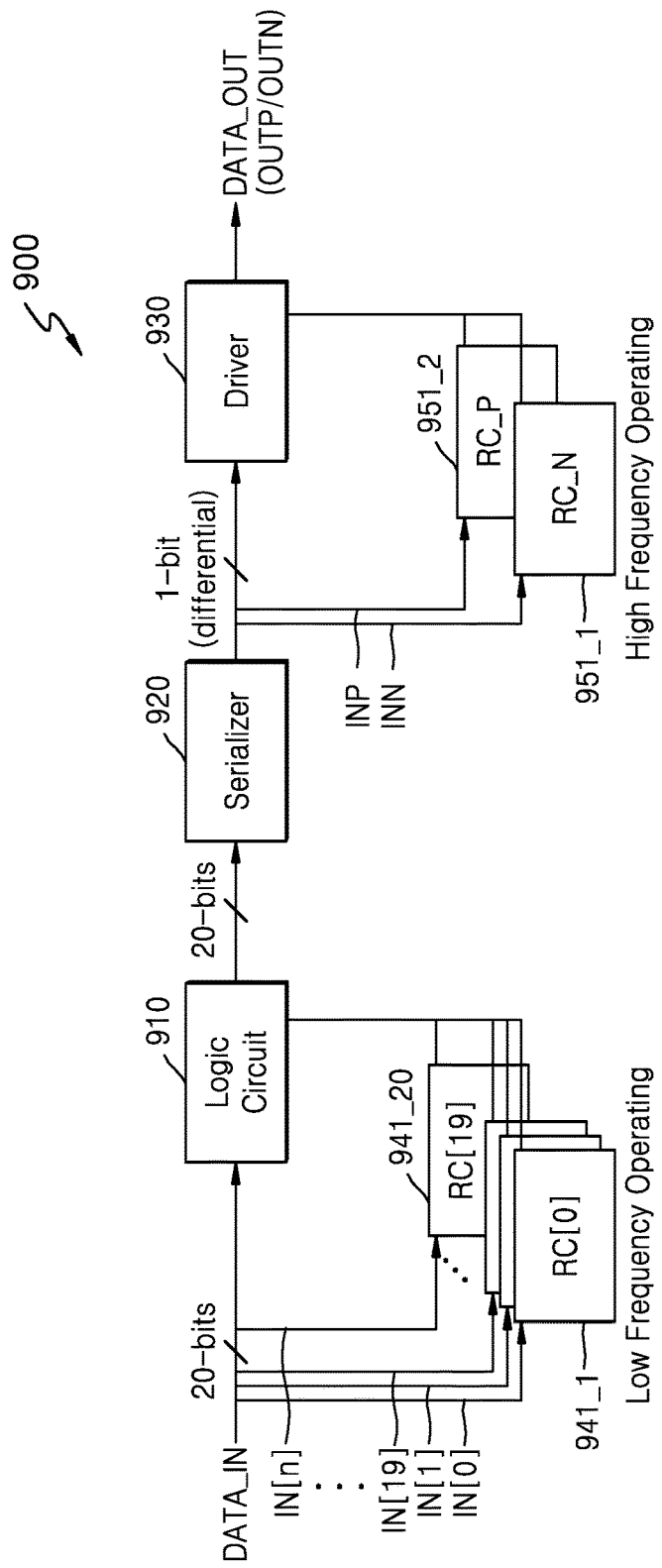
FIG. 14 is a block diagram of a semiconductor device in which a ripple compensator is applied to circuit blocks operating at different frequencies.

FIG. 14 is a block diagram of a semiconductor device 900 in which a ripple compensator is applied to circuit blocks operating at different frequencies.

Referring to FIG. 14, semiconductor device 900 may include a logic circuit 910, a serializer 920, and a driver 930, and as in the embodiment described above, it is assumed that logic circuit 910 receives input data DATA_IN corresponding to 20-bit parallel data IN[0] to IN[19]. Serializer 920 may receive and process the 20-bit parallel data IN[0] to IN[19] to generate serial data. As an example, serializer 920 may generate serial data corresponding to differential data INP and INN. Accordingly, serializer 920 may provide serial data to driver 930 via two data lines that carries the differential data INP and INN.

As in the embodiment described above, semiconductor device 900 may further include first to twentieth ripple compensators 941_1 to 941_20 corresponding to logic circuit 910 for processing the 20-bit parallel data IN[0] to IN[19]. The 20-bit parallel data IN[0] to IN[19] may be provided to first to twentieth ripple compensators 941_1 to 941_20, and each of first to twentieth ripple compensators 941_1 to 941_20 may provide a compensation current to logic circuit 910 according to a pattern of corresponding data.

Semiconductor device 900 may further include first and second ripple compensators 951_1 and 951_2 corresponding to driver 930 for processing the differential data INP and INN. First ripple compensator 951_1 may receive the first differential data INN and may generate a compensation current according to the above-described embodiments according to a pattern of the first differential data INN. second ripple compensator 951_2 may receive the second differential data INP and may generate a compensation current according to the above-described embodiments according to a pattern of the second differential data INP. Driver 930 may generate output data DATA_OUT(OUTP/OUTN) through a processing operation on the differential data INP and INN.

The differential data INP and INN may have complementary logic levels, and accordingly, first and second ripple compensators 951_1 and 951_2 may alternately provide compensation currents to corresponding circuit blocks. As an example, driver 930 may include a first circuit block for processing the first differential data INN and a second circuit block for processing the second differential data INP, and the first circuit block and the second circuit block may alternately receive compensation currents. In addition, logic circuit 910 may operate at a relatively low frequency, while driver 930 may operate at a relatively high frequency.

According to the embodiment as described above, each of first and second ripple compensators 951_1 and 951_2 may be implemented in a module form and arranged corresponding to each circuit block, and accordingly, ripple compensation may be performed on circuit blocks operating at different frequencies.

Figure 15:
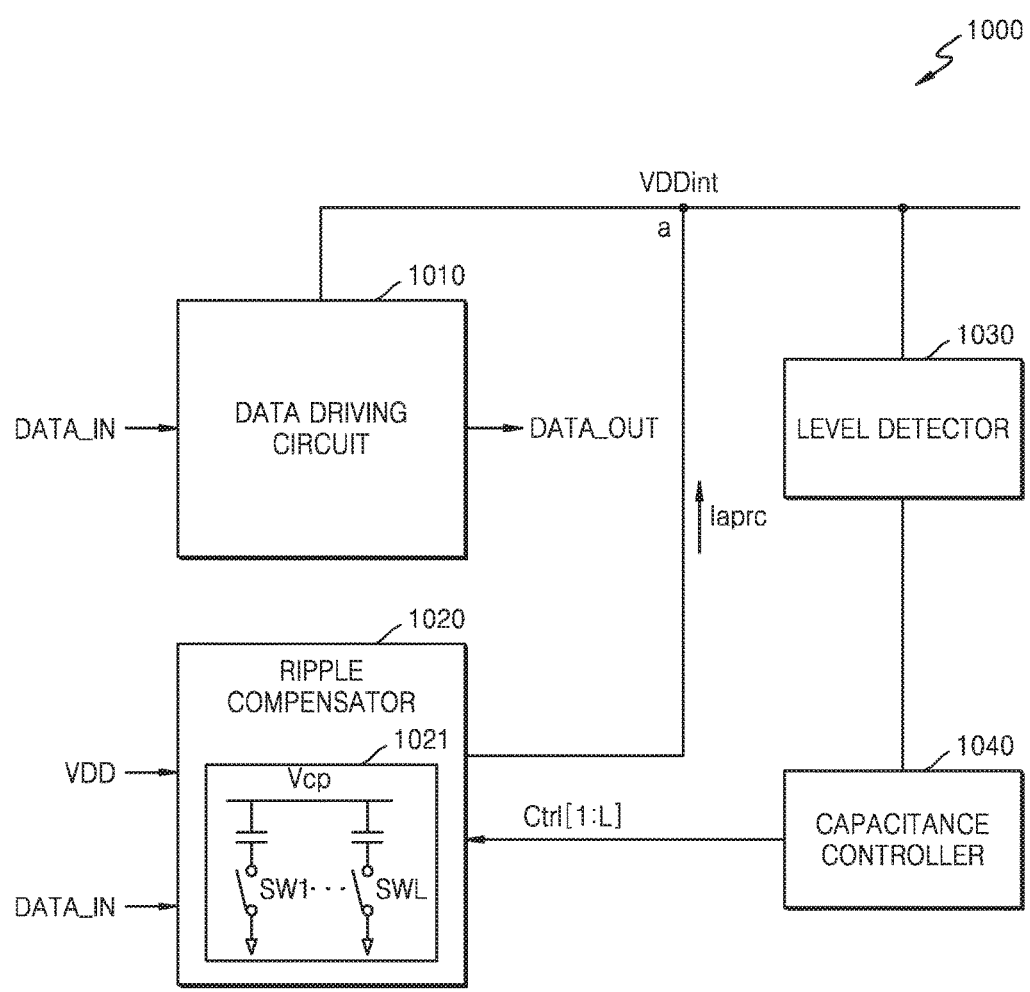
FIG. 15 is a block diagram of a semiconductor device that performs an adaptive ripple compensation operation using a variable compensation capacitance device.

FIG. 15 is a block diagram of a semiconductor device 1000 that performs an adaptive ripple compensation operation using a variable compensation capacitance device.

The magnitude of a compensation current may be adjusted according to the capacitance of a compensation capacitor used for increasing a voltage level of a compensation node, as in the embodiment described above. Referring to FIG. 15, the semiconductor device 1000 may include a data driving circuit 1010 and a ripple compensator 1020 and may further include a level detector 1030 that detects a voltage level of a first power supply voltage VDDint applied to a power supply voltage node "a," and a capacitance controller 1040 that generates control signals Ctrl[1:L] for adjusting the capacitance of a variable compensation capacitance device 1021.

Ripple compensator 1020, and in particular variable compensation capacitance device 1021, may include one or more compensation capacitors and switches SW1 to SWL corresponding thereto. Although not shown in FIG. 15, ripple compensator 1020 may include one or more buffers (not shown) for receiving input data DATA_IN, and the level of a compensation voltage Vcp applied to a compensation node "b" may increase according to a pattern of the input data DATA_IN. In addition, the degree of increase of the level of the compensation voltage Vcp may be adjusted according to the capacitance of the variable compensation capacitance device 1021, and accordingly, the level of a compensation current Iaprc may be adjusted.

According to an embodiment, level detector 1030 may detect the level of the first power supply voltage VDDint periodically or aperiodically, and the degree of ripple generated in the first power supply voltage VDDint may be determined according to a detection result. According to an embodiment, level detector 1030 may detect the level of the first power supply voltage VDDint through a test process during an initial operation of semiconductor device 1000, and capacitance controller 1040 may generate the control signals Ctrl[1:L] based on a detection result. Switches SW1 to SWL provided in ripple compensator 1020, and in particular in variable compensation capacitance device 1021, may be controlled to be turned on or off based on the control signals Ctrl[1:L], and a ripple compensation operation according to the embodiments described above may be performed according to capacitance adjusted by the control signals Ctrl[1: L] during a subsequent normal operation of semiconductor device 1000.

The ripple compensator, the data driving circuit including the ripple compensator, and the semiconductor device including the ripple compensator, according to the embodiments described above, may prevent an increase in the complexity of a circuit design, and/or may reduce a ripple of a power supply voltage adaptively to patterns of input data.

While the inventive concept has been particularly shown and described with reference to embodiments thereof, it will be understood that various changes in form and details may be made therein without departing from the spirit and scope of the following claims.

What is claimed is:

1. A semiconductor device, comprising:
   a data driving circuit configured to receive input data, receive a first power supply voltage through a first node, and generate output data by driving the input data; and
   a ripple compensator connected to the first node and configured to receive the input data in parallel with the data driving circuit, generate a compensation current corresponding to a pattern of the input data, and provide the compensation current to the first node to reduce a ripple of the first power supply voltage.

2. The semiconductor device of claim 1, wherein the ripple compensator comprises:
   a current source configured to generate the compensation current; and
   a switch configured to control supply of the compensation current to the first node,
   wherein the switch is turned on in response to at least one of a rising edge and a falling edge of the input data.

3. The semiconductor device of claim 1, wherein the data driving circuit comprises N drivers (where N is an integer that is equal to or greater than 2) for driving the input data corresponding to parallel data, and wherein the semiconductor device further comprises an additional (N−1) ripple compensators, for a total of N ripple compensators, and wherein the N ripple compensators are arranged corresponding to the N drivers.

4. The semiconductor device of claim 1, further comprising:
   a logic circuit configured to receive a second power supply voltage as a driving voltage, the logic circuit comprising N circuit blocks (where N is an integer that is equal to or greater than 2) that receive parallel data from outside the semiconductor device;
   a serializer configured to convert parallel data output from the logic circuit into serial data and to provide the serial data as the input data to the data driving circuit; and
   an additional (N−1) ripple compensators, for a total of N ripple compensators, and wherein the N ripple compensators are arranged corresponding to the N circuit blocks and configured to receive the parallel data from outside the semiconductor device in parallel with the logic circuit, to reduce a ripple of the second power supply voltage according to a consumption current in each of the N circuit blocks.

5. The semiconductor device of claim 1, wherein the input data comprises differential data having logic levels complementary to each other,
   wherein the data driving circuit comprises a first data driver and a second data driver corresponding to the differential data,
   wherein the ripple compensator is arranged corresponding to the first data driver and further comprising a second ripple compensator arranged corresponding to the second data driver.

6. The semiconductor device of claim 1, wherein the data driving circuit consumes an alternating current at a rising edge timing of the input data, and the ripple compensator generates the compensation current in synchronization with a rising edge of the input data.

7. The semiconductor device of claim 6, wherein a level of the alternating current consumed by the data driving circuit and a level of the compensation current generated by the ripple compensator are substantially equal to each other.

8. The semiconductor device of claim 1, wherein the ripple compensator comprises:
   a first transistor connected between a second power supply voltage and a second node, and having a diode connection structure;
   a buffer configured to receive the input data; and
   a compensation capacitance device connected between the second node and an output terminal of the buffer,
   wherein the compensation current is generated based on a level difference between a voltage applied to the first node and a voltage of the second node whose level rises according to a rising transition of the input data.

9. The semiconductor device of claim 8, wherein the buffer is driven by a third power supply voltage,
   wherein a voltage level of the second node has a level corresponding to the second power supply voltage when the input data corresponds to a logic low, and rises to a level corresponding to a sum of the second power supply voltage and the third power supply voltage, minus a threshold voltage of the first transistor, when the input data transits to a logic high.

10. The semiconductor device of claim 9, wherein the second power supply voltage and the third power supply voltage have a same level as each other.

11. The semiconductor device of claim 8, wherein the compensation capacitance device comprises a variable compensation capacitance device including one or more capacitors for adjusting, in response to a control signal, a capacitance of the variable compensation capacitance device related to a rise of the voltage level of the second node,
    wherein the semiconductor device further comprises:
    a level detector configured to detect a level of the first power supply voltage supplied to the first node; and
    a capacitance controller configured to generate the control signal according to a result of the detection.

12. A data driving circuit, comprising:
    one or more data drivers configured to receive input data, receive a first power supply voltage through a first node, and generate output data through an operation of processing a signal of which a level changes between the first power supply voltage and a ground voltage; and
    a ripple compensator coupled to the first node through a path for carrying a compensation current,
    wherein the ripple compensator comprises a buffer for receiving the input data and a compensation capacitance device connected to an output terminal of the buffer, the compensation capacitance device being configured to vary a voltage level of a second node in response to a transition of the input data and to transfer the compensation current to the first node based on a level difference between a voltage of the first node and a voltage of the second node.

13. The data driving circuit of claim 12, wherein the compensation capacitance device comprises one or more capacitors for adjusting a capacitance of the compensation capacitance device,
    wherein the capacitance is adjusted based on a result of detection of a voltage level of the first node.

14. The data driving circuit of claim 12, wherein the ripple compensator is driven by a second power supply voltage different from the first power supply voltage,
    wherein the first power supply voltage and a power supply current are provided from an external power source to the first node and a consumption current is generated in the data driver depending on a pattern of the input data, wherein the consumption current is supplied at least in part from the compensation current generated by the ripple compensator.

15. The data driving circuit of claim 14, wherein the ripple compensator further comprises a first transistor connected between the second power supply voltage and the second node and a second transistor connected between the second node and the path for carrying the compensation current,
wherein the compensation capacitance device is connected between the output terminal of the buffer and the second node.

16. The data driving circuit of claim 15, wherein each of the first and second transistors has a diode connection structure.

17. A ripple compensator connected to a first node of a circuit block generating a consumption current according to a pattern of input data, the ripple compensator comprising:
a first diode connected between a node to which a first power supply voltage is applied and a compensation node;
a buffer configured to receive the input data in parallel with the circuit block and driven by a second power supply voltage; and
a compensation capacitance device connected between an output terminal of the buffer and the compensation node,
wherein the ripple compensator is configured to supply to the circuit block a compensation current generated based on a voltage level difference between the compensation node and the first node of the circuit block.

18. The ripple compensator of claim 17, wherein the first node of the circuit block is a node on a line for providing a driving voltage to the circuit block.

19. The ripple compensator of claim 17, wherein the buffer is configured to increase a voltage level of the output terminal by a level of the second power supply voltage in response to a rising edge of the input data,
wherein the compensation capacitance device is configured to increase a voltage level of the compensation node by the level of the second power supply voltage in response to an increase in the voltage level of the output terminal,
wherein the compensation current has a level according to a voltage level difference between the compensation node whose voltage level is increased, and a node of the circuit block.

20. The ripple compensator of claim 19, wherein the first power supply voltage and the second power supply voltage are substantially the same as each other, and are different from a driving voltage provided to the circuit block.

* * * * *